United States Patent [19]
Martic et al.

[11] 3,743,833
[45] July 3, 1973

[54] RADIOGRAPHIC ELEMENTS AND BINDERS

[75] Inventors: Peter A. Martic; John M. McCabe, Rochester, N.Y.

[73] Assignee: Eastman Kodak Company, Rochester, N.Y.

[22] Filed: July 16, 1971

[21] Appl. No.: 163,464

[52] U.S. Cl. .......................... 250/483; 252/301.4
[51] Int. Cl. ............................................. H01j 1/62
[58] Field of Search ................... 250/80; 252/301.4

[56] References Cited
UNITED STATES PATENTS

| | | | |
|---|---|---|---|
| 2,819,183 | 1/1958 | Alles | 250/80 |
| 3,164,719 | 1/1965 | Bauer | 250/80 |
| 3,617,285 | 11/1971 | Staudenmayer | 250/80 |
| 3,650,976 | 3/1972 | Luckey | 252/301.4 |

Primary Examiner—James W. Lawrence
Assistant Examiner—Harold A. Dixon
Attorney—Robert W. Hampton, Bernard D. Wiese and Allen P. Rosenberg et al.

[57] ABSTRACT

Luminescent radiographic screen binders comprising a combination of a polyurethane elastomer alone or in combination with an alkyl methacrylate polymer in various weight ratios are disclosed. Said screens combined with radiographic sensitive elements exhibit improved optical and physical characteristics.

13 Claims, No Drawings

3,743,833

RADIOGRAPHIC ELEMENTS AND BINDERS

BACKGROUND OF THE INVENTION

This invention relates to luminescent screens alone and in combination with image-forming elements. In one aspect this invention relates to luminescent radiographic screens having improved and unexpected physical properties and improved light intensifying characteristics.

In still another aspect, this invention relates to screens comprising inorganic phosphors wherein the binding agent for said phosphors comprises a polyurethane elastomer alone or in combination with an alkyl methacrylate resin in various ratio ranges.

DESCRIPTION OF THE PRIOR ART

In the manufacture of radiographic elements, including a luminescent, light-intensifying screen, a phosphor, i.e., the substance which emits light upon radiation, is dispersed in a suitable binder in a variety of ways and in various ratios of phosphor to binder, depending in part upon the internal reflecting nature of the binder, the efficiency of the phosphor, the degree of the phosphor coverage and the like.

Those skilled in the art recognize that one purpose in seeking high phosphor to binder ratios is to more nearly insure maximum screen brightness in order to obtain increased speed, improved image definition, improved mottle characteristics and decrease the exposure of the subject to radiation.

It is known from Blank et al U.S. Pat. No. 3,282,697 issued Nov. 1, 1966, to use certain film-forming high polymers such as polystyrene, poly(vinyl toluene) and polycarbonates and other polyesters as binders. However, the light intensifying effect produced therein was achieved only by use of a limited selection of organic fluorescent substances which were capable of being added from solution to the organic binder.

It is likewise known that luminescence is improved where the phosphor coating is more dense and in particular by using salts of heavy metals from Group II of the Periodic Table (Lange's Handbook of Chemistry, 10th Edition; 1967, pp. 58 to 61). Exemplary of such phosphors are calcium tungstate, barium lead sulfate, zinc cadmium sulfide, zinc orthosilicate and the like. One recurring problem which persists, however, is that heavy coatings required of these phosphors to produce the desired results is not well tolerated by binders used heretofore so that cracking, crazing and general brittleness sharply curtails the screens effectiveness and use. It likewise limits the phosphor coating coverage.

It is not surprising, therefore, that DeLaMater in U.S. Pat. No. 3,023,313 issued Feb. 27, 1962, sought to replace the well-known calcium tungstate with activated alkali metal iodides using a polymeric binder having a refractive index as nearly like those salts as possible. In actual practice, however, image blurring in such systems necessitated incorporating relatively opaque pigments with a refractive index of at least 1.7 and with a low absorptivity for light in the blue-violet-ultraviolet spectral region. While this patent discloses a wide variety of polymers for use as binders and protective materials, it likewise reiterates the recurring problem whereby increased coating thickness increases speed somewhat but to the detriment of resolution. In particular these binders for activated alkali metal iodides were believed an improvement over the hard film forming cellulose nitrate–alkyl methacrylate polymer disclosed in U.S. Pat. No. 2,716,082 issued Aug. 23, 1955 to Smith.

It was the disadvantage of this type of brittle coatings, supported by rigid materials, which gave rise to the use of a more flexible polyvinyl butyral binder as set forth in U.S. Pat. No. 3,043,710 issued July 10, 1962 to Patten et al. But as seen hereafter, film sharpness tends to decrease with increased coating weights when using heavy metal phosphors in polyvinyl butyral binders. It became well-accepted heretofore, that it was better to optimally decrease the light input and thus reduce unsharpness by using pigments and other opacifying reflecting or light absorbing agents. In cases where ultraviolet emitting phosphors were used such as $BaPbSO_4$, ultraviolet light reflectors usually were employed.

While relatively high pigment to binder ratios are disclosed in U.S. Pat. No. 3,300,311 to Kennard et al. issued Jan. 24, 1967, those binders are water soluble copolymers of alkyl acrylate and acrylic acid and are unlike the substantially water insoluble binders disclosed herein which not only provide high coating coverage but uniform coating characteristics also.

While the use of certain high molecular weight copolymers such as Bisphenol A polycarbonate in a screen binder is taught by Staudenmayer in U.S. Pat. No. 3,617,285, issued Nov. 2, 1971, entitled "Light Intensifying Screens", these screens after being bent sometimes displayed hair-line or surface fissures. Even more flexible screens containing various mixtures containing the polycarbonate and Bisphenol A poly(tetramethyleneglycol)elastomers sometimes exhibit similar defects with certain coating weights and under certain conditions.

It is an object of this invention to provide improved relatively thick and heavily coated phosphorescent radiographic screens possessing vastly improved physical characteristics including flexibility, freedom from surface fissures, high phosphor to binder tolerable ratios, good contrast, high speed and image sharpness, good resistance to abrasion, handling and non-discoloration on aging.

It is another object of this invention to provide flexible screens in integral and non-integral combination with image forming light sensitive elements comprising a novel binder of a polyurethane elastomer alone or in combination with an alkyl methacrylate copolymer, where the alkyl has one to four carbon atoms such as methyl, ethyl, propyl, isopropyl, butyl, n-butyl and the like.

It is yet another object of this invention to provide a substantially flexible screen being a binder of elastomeric polyurethane alone or combined with an acrylate resin in which is dispersed a phosphor comprised of a heavy metal in a high coating density.

These and other objects will become obvious to those skilled in the art from an examination of the specification and claims which follow.

SUMMARY OF THE INVENTION

It has now been discovered that certain organic polymeric materials can be combined within various weight ratio ranges to provide unexpectedly and vastly superior binding agents for heavy metal phosphors.

The binders described herein are particularly desirable as compared to other known binders because of their physical characteristics which affect the utility of the screens in which they are placed.

The compounds useful in the practice of this invention include (1) polymers of alkyl methacrylate such as those having one to four carbon atoms in the alkyl moiety or other methacrylate esters, such as for example, n-butyl methacrylate resins and (2) polyurethane elastomers. By the term "elastomer" it will be understood to mean that property of substances of being able to stretch under tension and retract rapidly. These compounds typically contain long polymer chains and are manufactured and prepared generally by emulsion polymerization methods or others as are well known in the art. The polyurethane elastomers useful in the practice of the present invention are polymeric synthetic materials characterized by the urethane group —NH—COO—.

In particular, we have found that within specific ranges, the combinations of these polymers provide an effective, inexpensive, convenient and substantially continuous film forming binder for a variety of luminescent screens useful in radiography, neutron radiography and the like.

Typical of the alkyl methacrylate resins such as n-butyl methacrylate resins are the ELVACITE resins, an E. I. duPont deNemours trademark for its acrylic resins. Likewise, typical of the polyurethane elastomers described above are those presently available as ESTANE, a trademark of the B. F. Goodrich Chemical Co. for its polyurethane resin, for example.

The n-butyl methacrylate resins useful herein are the thermoplastic bead copolymers having an inherent viscosity of 0.53*. *(Inherent viscosity is measured from a solution containing 0.25g of polymer in 50 ml chloroform, measured at 25°C using a No. 50 Cannon-Fenske Viscosimeter.) These resins available as ELVACITE 2044 have a high thermal stability at temperatures, for example, of up to about 400°F to about 500°F so that they undergo smooth depolymerization to their monomers at about 700°F leaving a negligible ash. In addition they are resistant to ultraviolet light deterioration and other adverse action, and are soluble in solvents such as in weak spirits, and aliphatic hydrocarbons and the like.

Elastomeric polyurethane polymers, e.g., that commercially available as ESTANE 5707, which are useful in practicing this invention are thermoplastic elastomer resins having a specific gravity greater than 1.00 and more nearly about 1.20.

These polyurethanes likewise have an extremely high tensile strength at high ultimate elongation and they are possessed of excellent resistant properties to various solvents. In addition, they are cut, tear and abrasion resistant and can by easily converted to their end products by standard thermoplastic methods including milling, calendering, extrusion and the like. Their hardness (measured on Shore-A-Scale) is from about 70 to 95 and their stress strain properties measured by tensile strength is about 3,000 to about 12,000 lb/sq. in. They have a modulus at 300 percent elongation of about 4,000 to about 5,000. When compared to natural rubber, the elastomers useful in this invention have an abrasion resistance factor of from about 1.2 to about 4.5 times as great.

It will be understood that by the use of the terms urethanes or polyurethanes is meant those compounds which are either esters of unstable carbamic acid or amide esters of carbonic acid or polymers thereof.

The basic materials used in the preparation of the polyurethane elastomers used herein comprise a linear polyol component such as a polyester or polyether. In a typical material at least a portion of the carboxylic acid is adipic acid and the glycol portion can be alkylene glycol such as lower alkylene, such as those having from one to six carbon atoms like ethylene-, 1,3-butylene-, 1,4-butylene-, 1,2-propylene and the like while higher molecular weight glycols can be used if desired for specific purposes.

Polyurethane resins found useful in accordance with the present invention are thermoplastic elastomeric polyurethanes made by reacting p,p'-diphenylmethane, diisocyanate, adipic acid and butanediol-1,4 in such proportions that all of the isocyanate groups have reacted to give a substantially unreactive polymer.

Other isocyanates generally useful are the diisocyanates of tolylene, 4,4'-diphenylmethane, 1-5-naphthylene and the like. These can, of course, be extended with an equivalent weight or an excess of simple diols and/or triols. General methods of preparation are well known in the art and are fully disclosed in various sources such as Encyclopedia of "Polymer Science and Technology" Vol. II, John Wiley.

While preferred elastomeric polyurethanes contain essentially polymers which are the reaction product of butylene glycol, adipic acid and p,p'-diphenylmethane isocyanate although trace amounts of water, insoluble materials such as other acids and esters may be present. These include aryl esters such as di- or triphenyl phosphate and the like; alkaryl esters such as di-2-ethyl hexyl phthalate, and long chain saturated fatty acids such as those containing from about 10 to about 25 carbon atoms like hexadecanoic acid, pentadecanoic, octadecanoic acid and the like.

In addition to the other desirable physical characteristics, the binders disclosed herein are preferred for their adhesive properties since they can be readily coated on a suitable support and, in turn, accept a variety of overcoating materials.

DESCRIPTION OF THE PREFERRED EMBODIMENTS

One embodiment of the present invention comprises a radiographic screen comprising a support bearing a layer comprising a phosphor dispersed in a binder comprising an elastomeric polyurethane.

Another embodiment of this invention relates to luminescent radiographic screens comprising a support bearing a layer comprising a phosphor having a host matrix of at least one lanthanide metal ion and preferably one having a physical density greater than about 4.1 gm/cm$^3$ dispersed in a binder comprised of (1) an elastomeric polyurethane alone or in combination with (2) an alkyl methacrylate polymer each in a ratio range of from about 2 to 1 to about 50 to 1 respectively and preferably at from about 6 to 1 to about 12 to 1.

The proportion of alkyl acrylate is found to be most effective at about 2 percent to about 16 percent and preferably about 5 to about 12 percent of the total weight of the polyurethane elastomer.

In yet another embodiment, the overcoat layer can be a low gloss, matte layer prepared from a polyurethane elastomer resin similar to or identical to the binder composition. For example, a particularly effective matte finish consists essentially of (1) a thermoplastic polyurethane like XP-1941 of Spencer Kellog described in co-filed application of McCabe "Improved Coating Compositions" Ser. No. 163,444 filed July 16, 1971; (2) a film-forming acrylic emulsion such as exemplified by RHOPLEX RA-90, a trademark of Rohm and Haas for a composition consisting essentially of about 75 percent ethylacrylate, about 20 percent acrylonitrile and about 5 percent acrylic acid and (3) a non-film forming acrylic emulsion such as RHOPLEX B-85, also a trademark of Rohm and Haas for a 38 percent aqueous dispersion of acrylic polymers. This matte finish dispersed liquid formulation is coated at a range of from about 2.4 to about 4.5 ml/ft$^2$ on the screen described herein by known extrusion hopper means. Once coated, it is dried at a temperature range of from about 55° to 68° C for about 5 to 7 minutes, care being taken not to use too high heat or so long that the film is transparentized. Overcoats so-prepared do not adversely effect speed, sharpness or other general physical appearances and resist abrasion and other normal handling operations.

In addition there has been found a preferred method of coating the polyurethane containing binder for the phosphors which also contributes to the increased flexibility and elimination of surface fissures. This method employs use of significantly low temperatures immediately after coating, such as from about 21°C to about 30°C with a restricted or low air flow followed by a second warming step at a sharply higher temperature range.

It has been found that particularly efficient screens are prepared according to this invention when the support, such as a film formed from a polyester like poly-(ethylene terephthalate), exhibits a high absorptivity to light emitted by the phosphor in the spectral region, such as for example, in the ultraviolet region light of from about 410 nm and less. Such an intensifying screen exhibits increased sharpness when the film support bears a non-color imparting or dye containing layer comprising said luminescent phosphor. It it emphasized that by this use of the term "pigment" it will be understood to mean a light-absorbing or light-reflecting or opacifying substance even through it is known that certain phosphors in fact have been used as opacifying addenda. For example, zinc sulfide, barium lead sulfate, calcium tungstate and the like have been used with good results as addenda having a high refractive index.

The radiographic intensifying screen can emit in a wide spectral range and, in a preferred embodiment depending upon the particular phosphor employed, can have a substantial part, that is, more than half, of its total spectral emission at a wavelength shorter than about 410 nm. This emission falls, in a substantial part, in the ultraviolet range of the spectrum and we have found that certain inorganic heavy metal ion-containing phosphors are particularly useful therefor. Such preferred phosphors have a physical density greater than at least about 4.1 gm/cm$^3$ and preferably greater than 4.4 gm/cm$^3$. Particularly effective screens used in the practice of this invention use phosphors containing ions of heavy metals, including those from the lanthanide group of the periodic table. The latter rare earth elements have an atomic number in the range between 57 to 71 and include lanthanum, cerium, samarium, europium, gadolinium and the like.

Particularly effective heavy metal ion-containing phosphors are those selected from the group consisting of lead sulfate, lanthanide- or lead-activated BaSO$_4$, lead-activated barium silicate, gadolinium-activated yttrium oxide, lanthanide or lead-activated strontium sulfate, or various mixed alkaline earth phosphors such as barium-strontium sulfate, europium-activated barium strontium sulfate and the like where the lanthanide activator has more than half its emission in the ultraviolet region, and barium fluoride, barium fluoride chloride and the like. Said phosphors can be prepared by a number of ways, such as set forth in Belgian Pat. No. 703,998 issued Mar. 18, 1968 to Luckey, in Buchanan et al., "J. Applied Physics," Vol. 39, pp. 4342–4347 (1968) and in Clapp and Ginther, "J. Opt. Soc. of Amer.," Vol. 37, No. j. pp. 355–362 (1947). We have found that satisfactory results are achieved equally well using phosphors which have their emission peak in the near ultraviolet or ultraviolet regions, that is, about 410 nm or less. Barium lead sulfate is such an example, since it emits in both the blue and ultraviolet regions but peaks in the near ultraviolet at about 370 nm. Still others such as red region emitters and those like calcium tungstate, although it emits only a minor portion in the ultraviolet region and peaks in the blue region, are equally effective when combined in the binder disclosed herein. In such cases, in order to enhance image sharpness and prevent unwanted crossover light, various light absorbers are used. For example, where a blue emitting phosphor is used, a blue absorber such as carbon or a yellow dye dispersion would be used. When an ultraviolet emitting phosphor is used, then an ultraviolet absorber would be employed as shown hereafter. Useful ultraviolet absorbers include benzidine yellow YB-2 Transidene Yellow Lemon Shade YB45, Cl pigment Yellow 12, and 1-[2-(N-Cyclohexylcarbamoyloxy)ethyl]-6-(2,2-dicyanovinyl)-1, 2,3,4-tetrahydro-2,2,4,7-tetramethyl-quinoline and the like. Further, by various processing means, such as grinding, bombarding, fluid energy processing and the like desirable phosphor particle sizes and configurations are obtained. A preferred average microscopic size for the phosphor, and particularly for the lead activated barium sulfate in from about $0.1\mu$ to about $30\mu$ and a particularly useful range is from about $1\mu$ to about $15\mu$ in which case about 80 percent by volume of the particles fall within an average size range of about 10 to 14 microns. Consequently, the X-ray intensifying screens used in our combinations are comprised of phosphors which have various particle sizes and, which preferably substantially emit at wavelengths even less than about 380 nm. The improved luminescent intensifying screens which form our invention comprise a phosphor or combinations thereof which can be dispersed or suspended in the novel binder combination such as set forth herein. This binder can be further characterized as being a coherent film-forming macromolecular polymeric binder which forms a continuous phase after casting and contains the phosphor dispersed therein. The phosphors can be present in the binder in a very wide range of concentrations such as, for example, at a phosphor to binder ratio of from about 10:1 to about 25:1 and preferably in the range of from about 12:1 to about 16:1. The coverage of said phosphor is particularly effective in the screen in a wide coating range from about 8 to about 75 grams/ft$^2$ and preferably at about 20 to about 50 grams/ft$^2$ depending in part on the phosphor employed while still maintaining the physical and optical characteristics required. Likewise, the manner in which these screens can be coated is effected in a variety of ways such as directly over the photosensitive layer or on both sides of a double or single coated element.

The screen binder comprises a prefered weight ratio range of the components (1) a polyurethane elastomer alone or in combination with (2) alkyl methacrylate polymer, such that the concentrations of (1), separately and together with (2), are sufficient to impart a high degree of flexibility, high speed and high resolution to the screen.

One preferred embodiment comprises such a luminescent film-screen described herein having the phosphor present in relation to its binder in which it is dispersed, in a ratio range of from about 10 to 1 to about 25 to 1 and preferably about 10 to 1 to about 16 to 1 which is equivalent to a phosphor coverage of about 50 to about 68 grams of phosphor per ft$^2$.

In general, the ultraviolet absorbing materials employed in the practice of this invention possess the characteristics of solvent stability, and compatibility with other absorbing materials possessing similar characteristics, in order that they can be used alone or in combination therewith. In addition, the ultraviolet absorbing compounds employed in the practice of this invention are non-proteinaceous and possess little or no absorption in the visible range of the electromagnetic spectrum. This means that the absorbers are most effective at wavelengths of about 410 nm or less. It is equally important that these ultraviolet, non-fluorescing absorbers be essentially non-color imparting in order to obviate extensive leaching or bleaching processes as are required for fugitive type and sometimes pigmented absorbers.

A class of particularly good absorbing materials for use in the elements and systems of this invention are furanones. Suitable materials possess the general formula:

$$\begin{array}{c} O \\ O=C \quad \diagdown \\ \quad \quad \quad C=D-W-Q \\ A-C=\!\!=\!\!C-B \end{array}$$

wherein A is

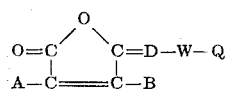

R being an amino, substituted amine, alkoxy, aralkoxy, alkyl, aryl, or heterocyclic substituent; B is an alkyl, aryl, aralkyl, alkaryl or H substituent; D is a methylidene radical

a polymethine chain

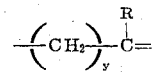

a hydrazinylidene radical or alkylenemethylidene radical

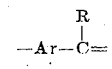

an arylene methlidene radical,

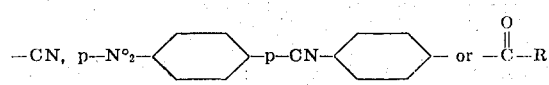

where Ar is an aryl group and R is hydrogen, alkyl phenyl or substituted phenyl, $x$ is 1 to 3 and $y$ is 1 to 4; W is either a carbon-carbon single bond or a methylidene radical; Q is an alkyl, aryl, or a heterocyclic ring and D, W and Q taken together can be a cycloalkylidene group having five to six carbon atoms.

It will be understood that in the above formula, amino is —NH$_2$; substituted amine can be represented for example by anilino, diethyl or dimethyl amino, methyl or ethyl amino and the like; alkoxy can be a radical containing one to six carbon atoms in the alkyl portion, such as methoxy, propoxy and the like; aralkoxy represents a moiety in which the alkyl portion has less than six carbon atoms, for example, phenethoxy, phenmethoxy and the like; alkyl is a moiety having one to eight carbon atoms; such as methyl, ethyl, propyl, isopropyl, butyl and the like; aryl is a moiety having up to 20 carbon atoms such as exemplified by phenyl, naphthyl, aminophenyl, nitrophenyl, chlorophenyl and the like; heterocyclic is exemplified by uniazolyl, imidazolyl, furyl, pyrolyl, quinolyl 1,3,3-trimethylinodolene 2-ilidene, julolydyl, benzothiazole and the like; aralkyl is exemplified by benzyl, phenethyl, naphthylmethyl and the like; alkaryl is represented by tolyl, (ortho, meta or para) xylyl, methyl-naphthyl and the like; alkylidene is exemplified by pyroxylidene methylidene and the like and aralkylidene is exemplified by phenylenemethylidiene and the like.

Specific examples include:

3-cyano-5-orthonitrobenzylidene-4-phenyl-2(5H)furanone 5-benzylidene-4-methyl-3-p-nitrophenyl-2(5H)furanone 3,3-di(p-nitrophenyl)-2(5H)furanone 5-benzylidene-3-carbamoyl-4-phenyl -2(5H)furanone 3-cyano-4-phenyl-5,4-pyridylmethylene-2(5H)furanone 3-carbamoyl-5(2-methylbenzylidene)-4-phenyl-2(5H)furanone 5-benzylidene-3-N(ethoxycarboxyl)carbamoyl-4-phenyl-2(5H)furanone 5-benzylidene-3-phenyl-ureido-4-phenyl-2(5H)furanone 5-benzylidene-3-cyano-4-phenyl-2(5H)furanone 3-cyano-5-dimethylamino-methylidene-4-phenyl-2(5H)furanone When incorporated in the base, the above-described class of ultraviolet absorbing materials are suitably added to the linear polyester resin powder in a range from about 50 to about 2,000 parts per million prior to extrusion, drafting and tentering.

It will be understood by those skilled in the art that the radiographic image recording elements disclosed herein can be processed in a variety of ways, such as by use of the manual conventional multi-tank methods well known in the art and in the automatic processing systems disclosed in Belgian Pat. No. 700,301 issued Aug. 31, 1967 to Barnes, Rees and Wilt and by the methods disclosed in U.S. Pat. No. 3,232,761 issued Feb. 1, 1966 to Allen and Burness, for example. These elements comprise a support which is substantially transparent or lightly tinted and is reasonably flexible so as to permit both conventional processing utilizing a series of processing tanks and a rapid access processing employing transport systems such as a mechanized roller transport system. Typical of said supports are cellulose nitrate film, cellulose ester film, polyvinyl acetal film, poly(styrene), poly(ethylene tetephthalate) film and other polyester film and the like. In a preferred embodiment the support comprises a linear condensation polymer of high molecular weight. One suitable polymer of this type is poly(ethylene terephthalate) which can be melt extruded to form bases of varying thicknesses as desired, e.g., in the range of about 1 to about 10 mils. Polymers of this type are often melt extruded at temperatures in the range of about 270°C to about 305°C. Due to their stability upon melt extrusion at such temperatures, the furanone ultraviolet absorbing materials described hereinafter form a preferred class of compounds which can be incorporated into such a base. In addition, the furanones are compatible with and non-subliming in poly(ethylene terephthalate) base.

These linear condensation polymers are linear polyesters of at least one glycol having two to 10 carbon atoms and at least one dibasic acid comprising at least 50 mole percent of an acid having two carboxyl radicals attached to a carbocyclic nucleus having from four to six carbon atoms per ring, said ester having a number average molecular weight of 10,000 to about 100,000, an inherent viscosity in a mixture of said ester having a number average molecular weight of 10,000 to about 100,000, an inherent viscosity in a mixture of 60 percent phenol and 40 percent tetrachloroethane of at least 0.3 and melting at from about 175° to about 350°C.

In addition to being suitably incorporated within the extrusion-formed base support, said ultraviolet absorbing materials can also be present when otherwise incorporated between the silver halide layers of the element. For example, these substantially non-color imparting absorbing materials can be present both in the support and coated over the base support and carried in a suitable layer such as a hydrophilic colloid layer, like gelatin, or water dispersible vinyl polymers or mixtures thereof and the like.

Suitable other ultraviolet absorbing materials useful in such layer arrangements alone or in combination as described above include not only the above-identified furanones but also several types of organic compounds such as the benzophenones, such as exemplified by 2,2′dihydroxy 4,4′ dimethoxy benzophenone and the like, the benzotriazoles such as exemplified by 2(2-hydroxy, 5-methylphenyl) benzotriazole and the like and the acrylonitriles and the like.

The double coated silver halide image-recording screen combination products of this invention include both integral or non-integral phosphor-containing intensifying screens which are employed outward from each silver halide coating on opposite sides of the support for the ultraviolet sensitive silver halide coatings. An improved system of this type is achieved by employing phosphors capable of emitting substantially within the ultraviolet electromagnetic spectral range, i.e., at about 410 nm or less. Phosphors which are particularly useful and preferred are those disclosed in and prepared according to Belgian Pat. No. 703,998 issued Mar. 18, 1968 to Luckey. Typical of said phosphors are lanthanide- or lead activated $BaSO_4$, lead activated barium silicate, europium activated barium strontium sulfate, gadolinium activated-yttrium oxide, and barium fluoride and the like.

These screens can be coated in a variety of ways such as directly over a silver halide layer, on the opposite side of the support from a silver halide layer or on both sides of a double coated silver halide element. Layers such as stripping layers, subbing layers and the like and protective or overcoat layers can likewise be used between or over the X-ray sensitive layers and the intensifying screens.

For example, a matte layer which is capable of providing a non-blocking surface to the overcoat is employed with good results. This layer can be of any desired thickness such as from 0.1 to about 0.5 mil thick and comprises a minor percentage of silica particles such as those commercially available under the name of CAB-O-SIL, a trade of Cabot Chemical Co. for silicon dioxide. These are conventionally cast from organic solvents such as acetone, methanol, methyl cellosolve and the like. In concentrations of about 10 to about 25 parts per hundred of binder, reduced blocking, forrotyping and reduced dusting on the back surface is achieved without interfering with the radiographic image.

A particularly effective overcoating composition essentially consists of various esters of cellulose such as cellulose acetate and the like, although a variety of other overcoatings are effective such as one employing the combination of (1) poly methylmethacrylate and (2) a copolymer of ethyl acrylate, acrylic acid and acrylonitrile.

The silver halide coatings can contain any of the hydrophilic, water permeable binding materials suitable for this purpose. Such suitable materials include gelatin, colloidal albumen, polyvinyl compounds, cellulose derivatives, acrylamide polymers and the like alone or in combination and mixture. The binding agents for the emulsion layer of the photographic element can also contain dispersed polymerized vinyl compounds. Certain of these compounds are disclosed for example in U.S. Pat. Nos. 3,142,568 of Nottorf issued July 28, 1964 ; 3,193,386 of White issued July 6, 1965 ; 3,062,672 of Houck et al. issued Nov., 1962; and 3,220,844 of Houck et al. issued Nov. 30, 1965; and include the water insoluble polymers and latex copolymers of alkyl acrylates and methacrylates, acrylic acid sulfoalkylacrylates or methacrylates and the like.

Each of these photographic silver halide coatings generally comprises silver in the range of about 275 to about 625 mg of silver per square foot but good results are obtained using coverages having a range of about 300 to about 450 mg per square foot.

Double coated photographic silver halide layers, i.e., those coated on opposite sides of a support, can also contain certain additives, particularly those known to be beneficial in such layers. For example, they can contain speed increasing compounds, such as the onium salts like quaternary or ternary sulfonium salts, polyalkylene glycols, thioethers and the like. The photographic silver halide dual coatings can be stabilized with mercury compounds, azaindines, quaternary benzothiazolium compounds, hydroxy substituted aromatic compounds and the like.

The photographic silver halide emulsions or coatings disclosed herein can also contain non-ionic, anionic and/or amphoteric coating aids. Some useful coating aids include, for example, saponin, alkyl substituted aryl oxy alkylene ethyl sulfonates of the type described in U.S. Pat. No. 2,600,831 issued June 17, 1952, a maleopimarates of the type described in U.S. Pat. No. 2,823,123 issued Feb. 11, 1958, taurine derivatives of the type described in U.S. Pat. No. 2,739,891 issued Mar. 27, 1956 and alkyl aminopropionates of the type described in U.S. Pat. No. 3,133,816 issued May 19, 1964. Typical of still other coating aids and surfactants which can be employed in the emulsions of this invention include the alkyl phenoxy poly(glycidols) having from about 5 to about 12 glycidol units, for example such as those disclosed in British Pat. No. 1,022,878 issued Mar. 16, 1966 to Olin Mathieson.

These photographic emulsions and coatings can contain incorporated developing agents such as polyhydroxy benzenes, aminophenols and 1,3-pyrazolidones and the like. The photographic coatings and emulsions can also contain spectral sensitizers such as cyanines, merocyanines, complex (tri-nuclear) cyanines and complex (tri-nuclear) merocyanines, styryls and hemicyanines.

In addition the silver halide radiographic emulsions and coatings can be chemically sensitized with compounds of the sulfur group, noble metal salts, such as gold salts, reduction sensitized with reducing agents and combinations of these. Furthermore, these sensitive layers and other layers present in the elements of this invention can be hardened with any suitable hardener or combinations such as aldehyde hardeners which are derivatives of dioxane, vinyl sulfones, oxypolysaccharides such as oxystarch, oxyplant gums, inorganic hardeners such as chromium salts and the like.

In addition, materials which are similar chemically and which have similar physical characteristics to the overcoat materials are used with good advantage as a curl control layer beneath the support. For example, as already disclosed, cellulose acetate is a preferred material for this type layer.

We have also found that a preferred method of overcoming the microcracks described herein includes using a thin overcoat of solvent solution provided (1) the solvent is not a solvent for the phosphor containing polyurethane elastomer coating and (2) that this overcoat is applied substantially before the underlayer is dried and initial cracking tends to occur.

The following examples are included for a further understanding of the invention:

EXAMPLE 1

Dispersions of a polyurethane elastomer and a polyacrylate are first prepared. ESTANE 5707F-1 is a trademark of the B. F. Goodrich Chemical Co. for a polyurethane resin. LUCITE 2044 is a trademark of the E. I. du Pont de Nemours Co. for an acrylic resin.

240 g of ESTANE 5707F-1 are dissolved in 1,260 g of tetrahydrofuran solvent by useful agitation using a propellor mixer for about 10 hours. In a similar manner 12 g of LUCITE 2044 are dissolved in about 48 g of solvent using agitation and the two resin solutions are mixed.

About 3,000 g of europium activated barium strontium sulfate phosphor is added to the resin mixture and dispersed by use of a high speed mixer for 10 minutes. In order to reduce bubbles, the dispersion is deaerated at 17 in. of water pressure. The percentage solids are measured and readjusted to about 70 percent solids with methyl ethyl ketone as a solvent.

This dispersion is coated at 49 g to 50 g/ft$^2$ of phosphor on subbed poly(ethylene terephthate) film support, drying at about 80°F for the first 10 minutes at low air flow and then 230°F for an additional 5 minutes.

The low initial drying temperature produces greater flexibility in the phosphor screen which resists cracking upon bending even in excess of 180°C. around a glass tube of 1 inch diameter.

EXAMPLE 2

A series of radiographic screens are prepared using BaSrSO$_4$: europium activated phosphor dispersed in a binder comprising a copolymer of ethyl acrylate with a chloroethyl vinyl ether, available as HYCAR 4021 X43 (a trademark of B.F.Goodrich for a chlorine derivative containing polyacrylic rubber) and poly n-butyl methacrylate, available as ELVACITE 2044 (a trademark of E. I. du Pont de Nemours, for n-butyl methacrylate polymer resins). The ratios employed are 9 parts of the former to 1 part of the latter in a 74 percent solids solution in a 9:1 blend of methylethyl ketone and methyl isobutyl ketone and the phosphor:binder weight ratios and coverages are 30:1 with a coverage of 50 gms/ft$^2$.

This binder is compared to the binder of the present invention at the same coverages as follows:

| Binder | Rel. Speed | Sharpness* | Knoop Hardness** |
|---|---|---|---|
| Hycar + Elvacite | 100 | 1 | 2.5 |
| Estane | 92.7 | 1$^-$ | 13.5 |

\* relative sharpness range of 1 to 4
\*\*Knoop hardness is the relative hardness of a material determined by the depth to which the bluntly pointed diamond pyramid of a special instrument will penetrate it.

A radiation-sensitive element containing a coarse grain silver bromoiodide gelatin emulsion having a coverage of 300 mg Ag/ft$^2$ and a gelatin emulsion coating of 276 mg/ft$^2$ on each side is placed between two of the phosphor screens prepared above.

In addition, a film-screen radiographic element is also prepared which is coated with silver bromoiodide on one side at a coverage of about 540 mg/ft$^2$ and which is integral with a single screen prepared as described.

After exposure with 70 Kvp to a chest phantom, speed values are determined by using an aluminum step wedge. The films are processed in a glutaraldehyde, hydroquinone containing developer fixed and washed. Both elements exhibit high contrast, low fog and superior image quality in addition to outstanding physical properties.

EXAMPLE 3

Various grades of elastomeric polyurethane are coated as in Example 2 incorporating therein the same luminescent phosphor. These coatings are then tested for flexibility and scratch resistance using the "fingernail test" to determine the relative ease of abrasion.

|  | Surface Fissures on Bending | Fingernail Scratch for Hardness* |
|---|---|---|
| Estane 5701 | Barely visible | 2 |
| Estane 5702 | Barely visible | 4 |
| Estane 5707 | No cracks | 1 |
| Estane 5707 F-1 | No cracks | 1 |
| Estane 5713 | Barely visible | 2 |
| Estane 5714 | No cracks | 2 |

*relative hardness 1, very hard to 4, very soft.

When 5.0 percent by weight of ELVACITE 2044 is added to Estane 5707 and 5707 F-1 solution, improved sharpness is obtained along with the same good physical properties of no microcracking and improved hardness.

EXAMPLE 4

Two phosphorescent screens of the present invention are prepared according to the method of Example 1. Each phosphor: binder ratio is 10 to 1 and the solvent employed in coating out the binder on the polyethylene terephthalate support comprises 25 to 62 percent by weight of the dispersion and is composed of 9 parts by weight of methyl ethyl ketone and 1 part of methyl isobutyl ketone. The $BaSrSO_4$:Eu screen is coated at 50 gms/ft$^2$. The screen comprising barium, lead (37 percent lead)sulfate is coated at a coverage of 25 gms/ft$^2$. An overcoat layer and a backing layer are provided for each screen which layers consist essentially of cellulose acetate which is laid down from a solvent solution.

The $BaSrSO_4$:Eu screen contains, in the poly(ethylene terephthalate) support, as an ultraviolet light absorber and antihalation addenda, 5-benzylidene-3-carbamoyl-4-phenyl-2(5H)-furanone. This colorless dye is applied in the process of manufacturing the support as disclosed in Belgian Pat. No. 752,842 issued Sept. 15, 1970 to Barkey and Hunter. In an alternative manner, this dye is applied in a separate antihalation layer for solvent using an acetate-butyrate binder and is present as 0.84 percent of the total solution used in the layer coating materials.

In addition to this ultraviolet absorbing dye incorporated into the polyester support, the barium lead sulfate containing screen also contains an additional ultraviolet-blue absorbing dye, present at about 0.0075 percent of the solids in the phosphor-binder layer. This dye has the formula corresponding to 1-[2-(N-cyclohexylcarbamoyloxy)ethyl[-6-(2,2-dicyanovinyl)-1,2,3,4-tetrahydro-2,2,4,7-tetramethyl-quinoline.

The 5(H)furanone ultraviolet absorbing compounds disclosed herein are made by well known procedures such as those disclosed by Swain et al. in J. Chem Soc. 152, 548 et seq (1944) and by Fort et al. in J. Org. Chem. 32 173 (1967).

Further, these and other compounds are disclosed in U.S. Pat. No. 3,507,648 issued Apr. 21, 1970. It will be understood that where the term "ultraviolet absorption" is used herein it means that degree of absorption of at least 50 percent and generally about 90 percent and above, such that the effectiveness of said ultraviolet light absorbing compounds is achieved.

When compared to polyvinyl butyral and polycarbonate binder screens described in the prior art having similar phosphor coverage, the screens of this invention show superior and improved image sharpness and scratch resistance unmottled surfaces, substantially no discoloration on aging, better wettability for layer bonding, improved flexibility, good pigment loading and coverage toleration as compared to those prior art binders.

In determining relative sharpness of the image produced in the radiographic sensitive film element, the intensifying screens described above are used with a light sensitive film layer coated at a thickness of 425 mg of silver per ft$^2$, using coarse grained silver bromoiodide. After exposing the object to be recorded to a 30 k.v. radiation source through a 0.5 mm copper filter, the element is processed in a unidirectional, high speed roller system apparatus of the type described in U.S. Pat. No. 3,545,971 issued to Barnes et al. on Dec. 9, 1970. Image sharpness and other quantities are recorded and compared. Those elements according to the present invention displayed improved physical and optical characteristics as shown hereinbefore.

The invention is described in detail with particular reference to certain preferred embodiments thereof, but it will be understood that variations and modifications can be effected within the spirit and scope of the invention.

There is claimed:

1. A phosphorescent radiographic screen comprising a support bearing a layer comprising a phosphor having a host matrix of at least one heavy metal ion having a physical density greater than about 4.1 $gm/_{cm}3$ dispersed in a binder comprising a combination of (1) an elastomeric polyurethane having a specific gravity above about 1.00 a hardness (measured on the Shore-A-Scale) of from about 70 to about 95, a tensile strength of between about 3,000 and 12,000 LB/sq. in., and a modulus at 300 percent elongation of about 4,000 to about 5,000 and (2) an alkyl methacrylate polymer in a weight ratio range of from about 2 to 1 to about 50 to 1 respectively.

2. A phosphorescent radiographic screen comprising a support bearing a layer comprising a phosphor dispersed in an elastomeric polyurethane binder having a specific gravity above about 1.00, a hardness (measured on the Shore-A-Scale of from about 70 to 95, a tensile strength of between about 3,000 and 12,000 LB/sq. in., and a modulus at 300 percent elongation of from about 4,000 to about 5,000.

3. The screen of claim 2 in which said support has a high absorptivity to emitted light in the spectral region of said phosphor.

4. The screen of claim 3 comprising 5-benzylidene-3-carbamoyl-4-phenyl-2-(5H)-furanone in said support as imparting a high absorptivity to light in the ultraviolet spectral region.

5. The screen of claim 3 in which said high absorptivity is to ultraviolet light.

6. The screen of claim 2 in which said support comprises a polyester film.

7. The screen of claim 6 in which said polyester is poly(ethylene terephthalate).

8. The screen of claim 2 in which said support bears a non-color imparting layer comprising said phosphor.

9. The screen of claim 2 in which said phosphor comprises at least one rare-earth activator.

10. The screen of claim 2 in which said phosphor comprises barium lead sulfate or europium activated barium strontium sulfate.

11. The screen of claim 2 further comprising a protective overcoat consisting essentially of cellulose acetate.

12. The screen of claim 2 further comprising a backing layer consisting essentially of cellulose acetate.

13. A screen according to claim 2 comprising a phosphor present in relation to said binder in a ratio range of from about 10 to 1 to about 25 to 1.

* * * * *

PO-1050
(5/69)

UNITED STATES PATENT OFFICE
CERTIFICATE OF CORRECTION

Patent No. 3,743,833         Dated July 3, 1973

Inventor(s) Peter A. Martic and John M. McCabe

It is certified that error appears in the above-identified patent and that said Letters Patent are hereby corrected as shown below:

Column 5, line 41, "It it" should read ---It is---.

Column 5, line 45, "through" should read ---though---.

Column 8, line 40, "1,3,3-trimethylinodolene" should read ---1,3,3-trimethylindolene---.

Column 9, line 23, "tetephthalate)" should read ---terephthalate)---.

Column 9, line 37, "terephthalate" should read ---terephthalate)---.

Column 13, line 54, that part of the formula reading "ethyl[" should read ---ethyl]---.

Column 13, line 60, "Fort" should read ---Ford---.

Signed and sealed this 18th day of June 1974.

(SEAL)
Attest:

EDWARD M. FLETCHER, JR.
Attesting Officer

C. MARSHALL DANN
Commissioner of Patents